(12) United States Patent
Kristjansson et al.

(10) Patent No.: US 11,841,754 B2
(45) Date of Patent: Dec. 12, 2023

(54) SERIES BATTERY DISCHARGE MANAGEMENT ACROSS A DEVICE SECTION BOUNDARY

(71) Applicant: Microsoft Technology Licensing, LLC, Redmond, WA (US)

(72) Inventors: Stefan Jon Kristjansson, Kirkland, WA (US); Jay Allen Kuehny, Sammamish, WA (US); Sachin Ramesh Chandra, Woodinville, WA (US); Yen Ying Lee, Kirkland, WA (US); Gene R. Obie, Redmond, WA (US); Jason Michael Battle, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 16/438,711

(22) Filed: Jun. 12, 2019

(65) Prior Publication Data

US 2020/0395765 A1    Dec. 17, 2020

(51) Int. Cl.
  *H02J 7/00*   (2006.01)
  *G06F 1/26*   (2006.01)

(52) U.S. Cl.
  CPC ............ *G06F 1/26* (2013.01); *H02J 2310/22* (2020.01)

(58) Field of Classification Search
  CPC .................................................. G01R 31/3835
  USPC ........................................................ 320/118
  See application file for complete search history.

(56) References Cited

U.S. PATENT DOCUMENTS

| | | | | |
|---|---|---|---|---|
| 7,528,581 B2 * | 5/2009 | Miyazaki | ............... | H02J 7/0019 320/163 |
| 7,800,342 B2 * | 9/2010 | Kobayashi | ............ | H02J 7/0019 320/118 |
| 8,810,195 B2 * | 8/2014 | Mochida | ............. | H02J 7/00034 320/108 |
| 8,860,422 B2 * | 10/2014 | Butzmann | ............. | H02J 7/0021 324/433 |
| 2010/0039764 A1 | 2/2010 | Locker et al. | | |
| 2013/0328399 A1 * | 12/2013 | Suzuki | ................. | G06F 1/1654 361/679.55 |
| 2014/0129164 A1 | 5/2014 | Gorbold | | |
| 2014/0191765 A1 * | 7/2014 | Takeshita | .................. | B60L 3/12 324/434 |
| 2015/0067362 A1 | 3/2015 | Sultenfuss et al. | | |
| 2019/0103750 A1 * | 4/2019 | Kristensen | ............ | H02J 7/0024 |
| 2019/0128970 A1 * | 5/2019 | Taya | .................... | G01R 31/371 |

OTHER PUBLICATIONS

"International Search Report and Written Opinion Issued in PCT Application No. PCT/US20/030565", dated Jul. 16, 2020, 13 Pages.

* cited by examiner

*Primary Examiner* — Yalkew Fantu
(74) *Attorney, Agent, or Firm* — Holzer Patel Drennan

(57) ABSTRACT

An electronic device supplies power to system load(s) from a first battery power source and a second battery power source connected in series across a re-configurable device section boundary. A battery monitor monitors voltage across each individual battery cell within the first and second battery power sources. The battery monitor directs a charge circuit as to how and when to charge the first and second battery power sources using an external power source. The battery monitor also directs the charge circuit as to how and when to use the first and second battery power sources to power the system load(s).

20 Claims, 5 Drawing Sheets

SERIES BATTERY DISCHARGE MANAGEMENT ACROSS A DEVICE SECTION BOUNDARY

BACKGROUND

Modern computing devices often rely on rechargeable battery power sources to provide mobile computing functionality. Some mobile computing devices, such as laptop computers, also support various physical configurations (e.g., a foldable computing device with two or more device sections). Such physical designs present opportunities and challenges for battery pack placement, charging ports and circuitry, protection circuitry, charging/discharging operation, and other design factors.

SUMMARY

The described technology provides an electronic device including a first device section, a second device section, and a high impedance electrical connection. The first device section contains a first battery power source including at least one cell and the first battery power source has a first associated voltage level. The second device section contains a second battery power source including at least two cells connected in series. The second battery power source has a second associated voltage level, that is higher than the first associated voltage level. The high impedance electrical connection traverses a device section boundary connecting the first device section to the second device section. The first and the second battery power sources are connected in series with respect to a system load of the electronic device across the device section boundary via the high impedance electrical connection. The system load requires a supply voltage level that is greater than the second associated voltage level and less than a combination of the first associated voltage level and the second associated voltage level.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
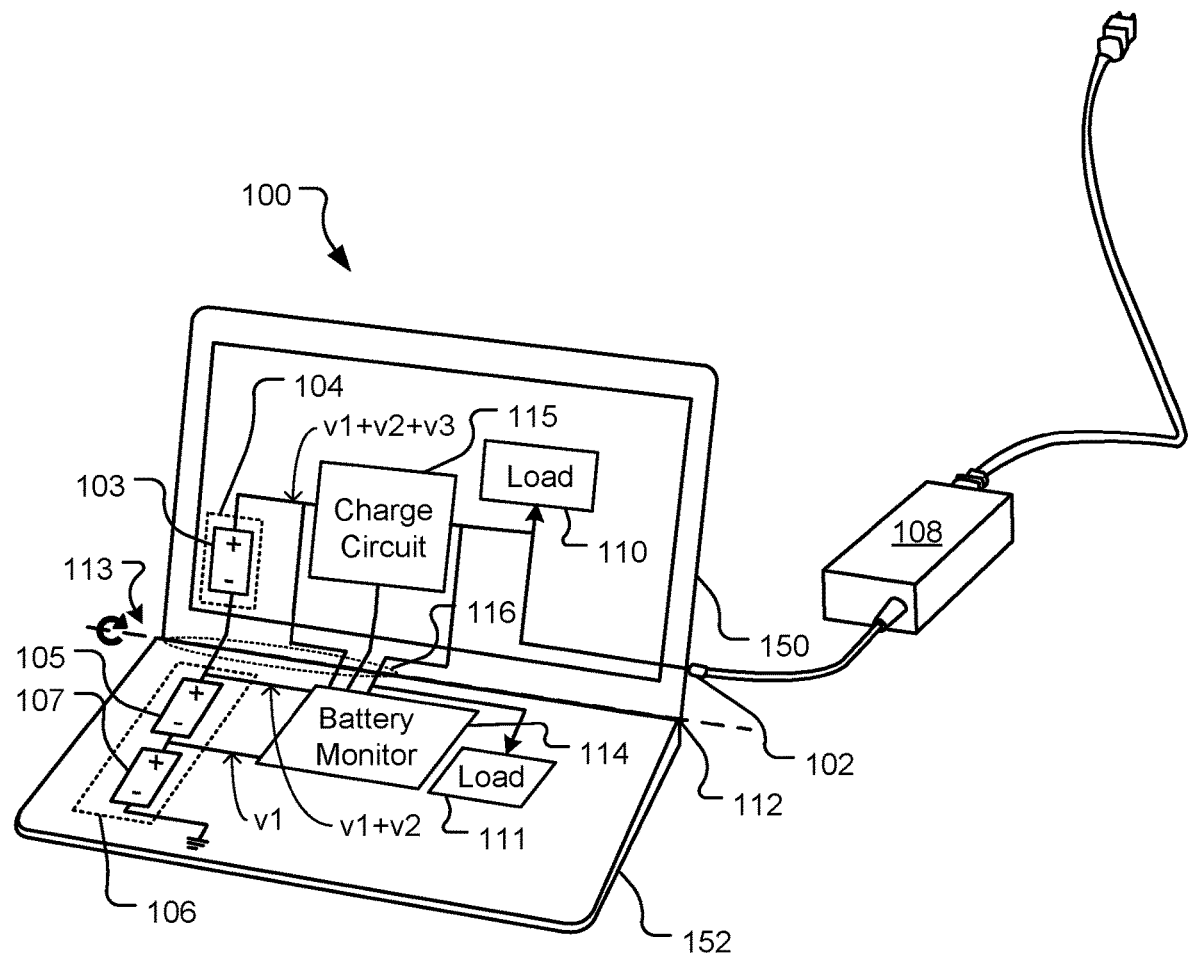
FIG. 1 illustrates an example electronic device having two device sections, each with a battery power source.

In a computing device that includes multiple device sections (e.g., a keyboard section and a display section, two display sections, and so on), a rechargeable battery power source (e.g., a battery pack or battery) can be placed in more than one device section. Not only does this approach provide valuable space for additional/larger batteries, but it can also present the option of powering each device section from its own battery power source. Including multiple battery power sources in an electronic computing device is also a way to extend run-time capacity by providing a larger charge capacity than that of a single battery power source. However, multiple battery power sources in a computing device can present protection and charging/discharging issues between the battery power sources and an external power source.

Prior art solutions incorporate a battery monitor and a charging circuit for each battery pack within a device section, which creates redundant protection systems. The presently disclosed technology enables a common battery monitor and a common charging circuit to be used by multiple battery packs connected in series across a device section boundary. In one example implementation, the battery monitor is located in one device section, while the common charging circuit is located in another device section, but the functionality of both the battery monitor and the charging circuit are shared between the device sections. The common battery monitor and the common charging circuit can reduce cost associated with running multiple battery packs connected in series across a device section boundary. Further, the common battery monitor and the common charging circuit is modular in that it could be used with devices with two or more device sections and/or devices with two or more battery packs. Still further, a simplified version of the presently disclosed technology may operate with a singular battery pack with multiple cells connected in series locate in only one of the device sections.

By sharing a common battery monitor between multiple battery packs connected in series, the battery monitor may selectively charge and/or discharge the battery packs based on a detected system state (including the state of each of the battery packs and load demands). It is generally more efficient to step down voltage to satisfy demands of various loads within the computing device rather than step up the voltage to achieve the same end. As such, battery power sources may be connected in series in an effort to increase supply voltage. As the battery packs have disparate charge and discharge characteristics, battery life preservation may depend on regular operation of the batteries at different charge and/or discharge rates.

Further, if two electrically-coupled battery packs have unequal states of charge at any time (e.g., 20% discharged and 70% discharged, for example), the battery pack with the higher state of charge may try to discharge into the other battery pack in an uncontrolled manner. If this discharge is too high due to battery voltage differences and different internal resistance between the battery packs, current protection may be tripped and/or the life of the battery pack receiving the discharge may be degraded. Furthermore, discharging (and then charging) a first battery pack more frequently than a second battery pack can cause disparate wear-and-tear on the first battery pack over time, such that the useful life of the first battery pack will end far before the second battery pack. The disclosed common battery monitor and common charging circuit may balance lifetime battery charging and discharging between the battery packs to reduce the likelihood that one battery pack is cycled far more than the other battery pack. Still further, the disclosed common battery monitor and common charging circuit reduces overall part count for the computing device, reducing overall device complexity and cost.

A flexible boundary ("a device section boundary") between device sections of the computing device can also introduce a high impedance connector into the battery circuit. Such a connector may experience enhanced mechanical wear and tear on the cabling and/or connectors between the device sections, potentially affecting electrical impedance across the device section boundary over time. In various implementations, the device section boundary is re-configurable in that it's physical orientation may change over time (e.g., in a hinged or otherwise flexible device).

Battery packs are referred to herein as "disparate" or "having disparate charge characteristics" when characterized by charge profiles that are substantially non-identical, such as when the battery packs have different charge capacities, voltage levels, and/or physical characteristics that may lead to different relative states of charge when simultaneously integrated within an electronic device. For example, two battery packs have disparate charge characteristics if they have different charge capacities, are at different states of charge, supply different voltage levels, and/or are physically located in proximity to system loads (and thus impedance) in such a way as to discharge at different rates (thereby leading to different states of charge).

FIG. 1 illustrates an example electronic device 100 having two device sections 150 and 152, each with its own battery power source (e.g., a first battery pack 104 and a second battery pack 106). The example electronic device 100 includes a distributed battery architecture that supports charging and/or discharging of battery packs with disparate charge characteristics connected in series. The electronic device 100 is shown to be a foldable mobile computing device in FIG. 1, but may be any battery-powered electronic device.

The electronic device 100 includes system loads 110, 111, each of which may include system electronics (e.g., a processor, memory, display, speakers, wireless circuitry) or other system loads supported by current from the first battery pack 104 and the second battery pack 106, which are electrically arranged in series. Further, each of the battery packs 104, 106 may include one or more individual battery cells, also electrically arranged in series. Both the device sections 150, 152 may include their own system loads 110, 111, respectively, as shown.

In one implementation, the first battery pack 104 includes one battery cell 103 (referred to as the "1S" battery or battery pack), and the second battery pack 106 includes two battery cells 105, 107 connected in series (referred to as the "2S" battery or battery pack). The two battery packs 104, 106 are rechargeable through a single charging node 102 when connected to an external power source, such as to charger 108 plugged into an outlet or other external power source. In at least one implementation, the first battery pack 104 and the second battery pack 106 are also rechargeable in the sense they may "rebalance" without a charger attached, if the system loads are light. Also, the first battery pack 104 and the second battery pack 106 may be dischargeable in the sense that their relative discharge rates to one or more system loads are balanced between the two battery packs 104, 106.

In different implementations, the first battery pack 104 and the second battery pack 106 may vary in relative charge profiles, positions, and connections within the electronic device 100. In one example implementation, the first battery pack 104 and the second battery pack 106 are of different charge capacities and/or different associated voltage levels (e.g., single-cell (1S) battery pack 104 includes a single 3-4.4V battery cell 103 and dual-cell (2S) battery pack 106 includes two 3-4.4V battery cells 105, 107 connected in series). Here, the output voltage of the battery cell 107 (v1) is combined with the output voltage of the battery cell 105 (v2) resulting in a summed output voltage of the second battery pack 106 (v1+v2). The output voltage of the second battery pack 106 is further combined with the output voltage of the first battery pack 104 (also the output voltage of the battery cell 103) (v3) to yield a summed output voltage of both battery packs 104, 106 (v1+v2+v3). Other combinations of battery packs having different numbers of individual cells, associated voltages, and disparate charge/discharge profiles may also be employed.

While the device sections 150, 152 include separate battery packs 104, 106, respectively, the electronic device 100 includes a common battery monitor (or gas gauge) 114 and a common charge circuit 115, one or both of which may include common protection circuitry as well. In FIG. 1, the first battery pack 104 (a 1S battery pack) has a smaller charge capacity and output voltage than the second battery pack 106 (a 2S battery pack). In other words, the voltage level associated with the second battery pack 106 is higher than the voltage level associated with the second battery pack 104.

Device sections 150, 152 of the electronic device 100 are designed to fold relative to one another at central hinged portion 112, as illustrated by arrow and axis 113. Other movable boundaries between the device sections 150, 152 may also be employed, including a boundary in which the device sections 150, 152 slide with respect to one another. Hinge wiring 116 extends through the central hinged portion 112 to couple the first battery pack 104 to the second battery pack 106. The hinge wiring 116 acts as an additive source impedance contributing to total electrical loss (e.g., voltage drop and power loss under load) between the first battery pack 104 and the second battery pack 106. If the second battery pack 106 alone was relied on to support the system loads 110, 111, electrical loss due to the source impedance may be, at times, high enough to risk system brown-out under especially high load transients. In the illustrated design, the first battery pack 104 and the second battery pack 106 combine to share the load of the system loads 110, 111, reducing the likelihood of a brown-out.

In various implementations, the battery monitor 114 monitors voltage output from each of the battery cells 103, 105, 107 to determine the state of charge of each battery cell, as well as voltage output from the charging node 102, if present. The battery monitor 114 then communicates with the charge circuit 115 to selectively charge one or more of the battery cells 103, 105, 107 from the charging node 102, discharge one or more of the battery cells 103, 105, 107 to power the system loads 110, 111, power the system loads 110, 111 using the charging node 102, and/or some combination thereof. By using a common battery monitor 114 and charge circuit 115, overall part count of the electronic device 100 is reduced while achieving a relatively high output voltage resulting from the series connection of the battery cells 103, 105, 107.

The battery monitor 114 may also cause the charge circuit 115 to balance the current supplied to the system loads 110, 111 from the first battery pack 104 and the second battery pack 106. By balancing the supplied current between the battery packs 104, 106, the electronic device 100 may receive one or more of enhanced run-time capacity, extended battery pack lifetimes, and reduced brown-out risk. Although not shown in FIG. 1, the charge circuit 115 may also include circuitry to selectively balance charge into and discharge from each of the first battery pack 104 and the second battery pack 106 according to their respective battery charge/discharge characteristics. Some example circuitry serving this purpose is shown in and discussed with respect to FIGS. 3 and 4.

Each of battery packs 104, 106 may include integral state of charge monitor and protection circuitry, although other implementations may omit one or both of these components. The integral battery state of charge monitors (or gas gauge or fuel gauge) measure the level of remaining capacity in a battery. Battery protection circuitry detects a variety of fault conditions, such as overvoltage, under-voltage, discharge overcurrent, and short-circuiting.

Additional details of computing device 100 of FIG. 1 may be as described elsewhere herein, including below with reference to circuits 200, 300 of FIGS. 2 and 3.

Figure 2:
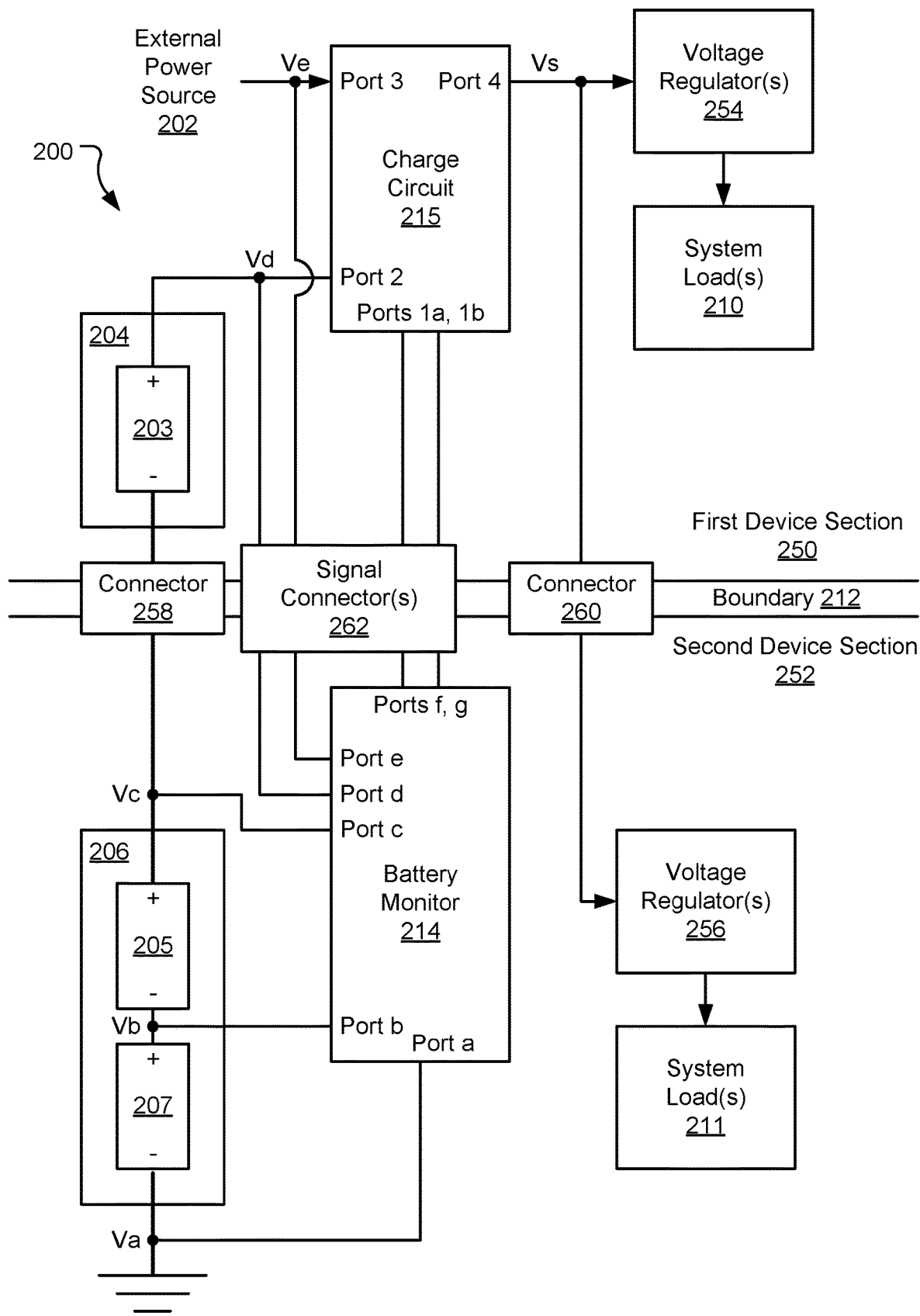
FIG. 2 illustrates an example schematic of a series battery management circuit.

FIG. 2 illustrates a schematic of an example series battery charge and discharge management circuit 200. A 1S battery pack 204 including a singular battery cell 203 located in a first device section 250 of a multi-section computing device (not shown, see e.g., computing device 100 of FIG. 1) is connected in series with a 2S battery pack 206 located in a second device section 252 of the computing device. The 2S battery pack 206 includes a pair of battery cells 205, 207 connected in series. In an example implementation, the battery cells 203, 205, 207 are cobalt based lithium-ion battery cells, each having a nominal cell voltage of 3.6V, an end-of-discharge voltage of 2.8-3.0V and a maximum charge voltage of 4.2 volts. As the battery cells 203, 205, 207 are connected in series, the overall system voltage is additive, resulting in a nominal cell voltage of 10.8V, an end-of-discharge voltage of 8.3-9.0V, and a maximum charge voltage of 12.6 volts, for example.

The first device section 250 may also be referred to as containing the 1S battery pack 204 and the second device section 252 may also be referred to as containing the 2S battery pack 206. Other types of battery cells, nominal voltages, and charge capacities may also be employed. The battery packs 202, 204 may present disparate voltages and charge capacities (e.g., the two series battery cells 205, 207 of the 2S battery pack 204 present approximately twice the voltage level of the single battery cell 203 of the 1S battery pack 202). Other disparate battery pack pairings may also be used (e.g., 3S and 1S). Such disparate battery pack pairings can be used in any implementation disclosed herein.

Battery monitor 214 monitors the state of charge of each of the battery cells 205, 207 by monitoring output voltages Va, Vb, Vc, Vd, and Ve at ports a-e, respectively. Va represents voltage at or near ground, which is at or near 0.0 volts. Vb represents voltage of the battery cell 207, which may be 3.0-4.4V. Vc represents discharge voltage of the battery cell 205 (and the 2S battery pack 206 overall), which in combination with battery cell 207, may be 6.0-8.8V. Vd represents discharge voltage of the battery cell 203 (and 1S battery pack 204 overall), which in combination with the 2S battery pack 206, may be 9.0-12.6V. Ve represents supply voltage of external power source 202, which may range from 2-20 v, but may be regulated to a point at or below a maximum charge voltage of the battery packs 204, 206 (e.g., at or below 13V). The battery monitor 214 uses the measured voltages to determine a state of charge of each of the battery cells 203, 205, 207 using a predefined relationship between voltage and state of charge for each of the battery cells 203, 205, 207. The battery monitor 214 communicates with the charge circuit 215 (see ports f, g of the battery monitor 214 and ports 1a, 1b of the charge circuit 215) to direct the charge circuit 215 to charge and/or discharge the battery packs 204, 206. The battery monitor 214 may also include protection circuitry to disconnect the battery packs 204, 206 if a fault is detected.

The charge circuit 215 receives input power from the battery packs 204, 206 at port 2 and/or input power from external power source 202 at port 3. One or both of the input power from the battery packs 204, 206 and from external power source 202 is output to voltage regulator(s) 254 at port 4 of the charge circuit 215. The output power is at source voltage (Vs), which may be the same or similar to Vd, Ve, or a combination thereof, so long as the charge circuit 215 does not step-up or step-down voltage prior to output at port 4 of the charge circuit 215.

Voltage regulator(s) 254, 256 generally step-down voltage to a level required to drive system load(s) 210, 211, respectively. In various implementations, there may be multiple voltage regulators that adjust voltage to different levels for different system loads. The system load(s) 210, 211 may include a variety of components that consume power, including without limitation display components, a system-on-a-chip (SOC), one or more microprocessors, one or more communication interfaces, a keyboard, a trackpad, a camera, a microphone, and a speaker. Further, the system loads 210 may be the same or similar to system loads 211, or entirely different from one another. In various implementations, one or both of the system load(s) 210, 211 may require a supply voltage level that is greater than the voltage level associated with one or either of the battery packs 204, 206, but less than a combined voltage level output from both of the battery packs 204, 206.

The two device sections 250, 252 are divided by a device section boundary (or central hinged portion) 212, which may include a foldable interconnection or hinge. As discussed above, the battery packs 204, 206 and the accompanying battery monitor 214 and charge circuit 215 are configured to supply power to the system load(s) 210, 211. Signal connectors 262 provide signal connections between the device sections 250, 252 that traverse the boundary 212 for the battery monitor 214 and the charge circuit 215, as described above. As the signal connections are low power, the signal connectors 262 are not of a particularly high-impedance.

High-impedance connectors 258, 260 provide driving power connections between the device sections 250, 252 that traverse the boundary 212. More specifically, high-impedance connector 258 transfers power between the battery packs 204, 206, as directed by the battery monitor 214 and the charge circuit 215. High-impedance connector 260 provides power supplied by the charge circuit 215 on the device section 250 to the voltage regulator(s) 256 and system load(s) 211 in the device section 252. While the battery pack 206 and the battery monitor 214 are depicted in the device section 252 and the battery pack 204 and the charge circuit 215 are depicted in the device section 250, the relative location of the components of the circuit 200 may vary widely from that shown so long as the battery packs 204, 206 share a common battery monitor 214 and a common charge/discharge circuit 215.

The high impedance connectors 258, 260 bridge the device section boundary 212 and may present a voltage drop equal to or greater than 5% of the supply voltage (Vs) to the system load(s) 210, 211. In other implementations, the high impedance connectors 258, 260 may present a voltage drop equal to or greater than 10% of the supply voltage (Vs) to the system load(s) 210, 211. Either implementation is referred to herein as a high-impendence connection.

In some implementations, the battery monitor 214 monitors the voltage drop caused by the connectors 258, 260, which may change over time as the boundary 212 is physically manipulated. The battery monitor 214 may also communicate with the voltage regulator(s) 254, 256 to vary the applied voltage step-down based on the voltage drop caused by the connectors 258, 260.

Additional details of circuit 200 of FIG. 2 may be as described elsewhere herein, including above with reference to computing device 100 of FIG. 1 and below with reference to circuit 300 of FIG. 3.

Figure 3:
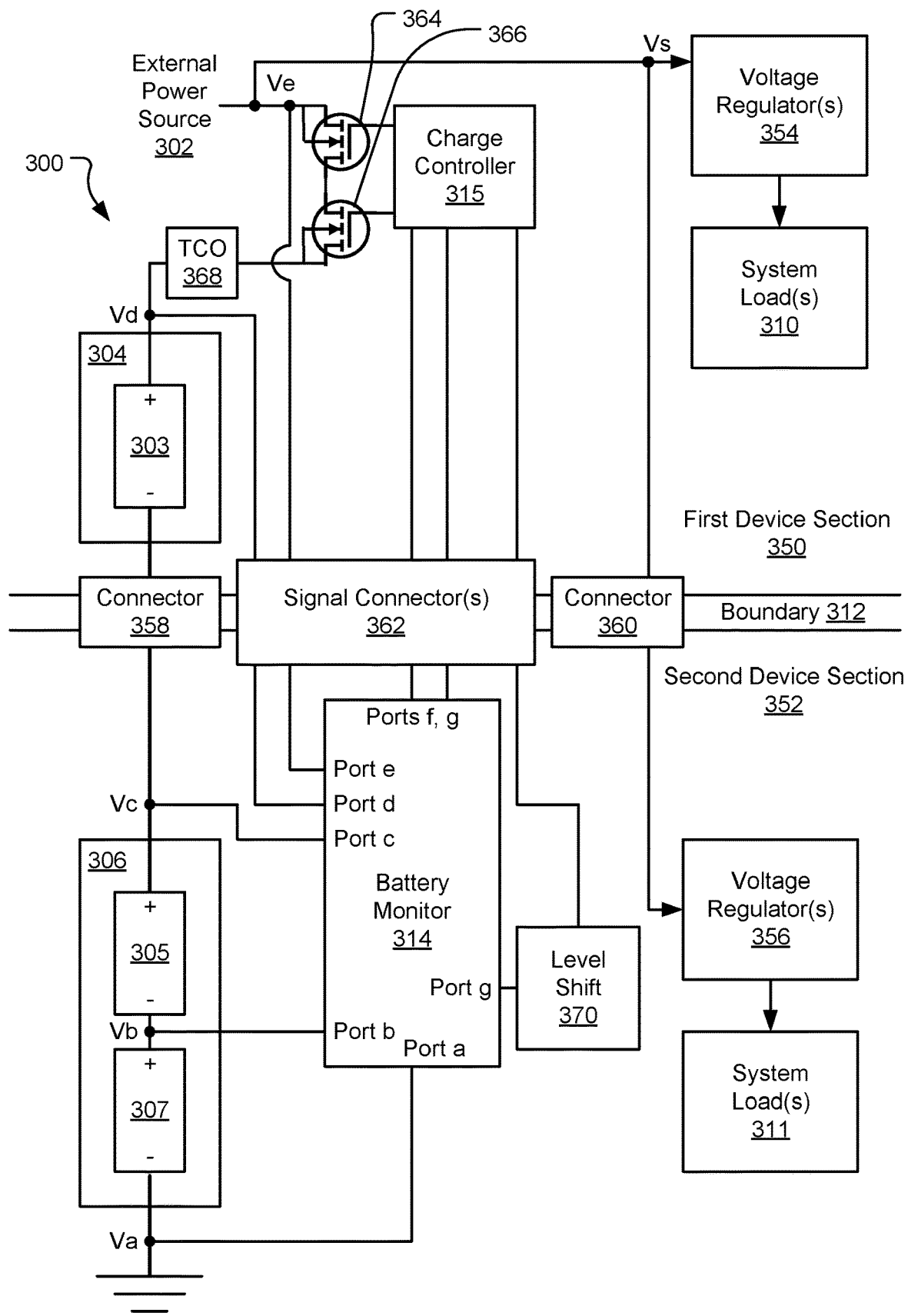
FIG. 3 illustrates another example schematic of a series battery management circuit.

FIG. 3 illustrates another example schematic of a series battery management circuit 300. A 1S battery pack 304 including a singular battery cell 303 located in a first device section 350 of a multi-section computing device (not shown, see e.g., computing device 100 of FIG. 1) is connected in series with a 2S battery pack 306 located in a second device section 352 of the computing device. The 2S battery pack 306 includes a pair of battery cells 305, 307 connected in series.

Battery monitor 314 monitors the state of charge of each of the battery cells 305, 307 by monitoring output voltages Va, Vb, Vc, Vd, and Ve at ports a-e, respectively. Va represents voltage at or near ground. Vb represents discharge voltage of the battery cell 307. Vc represents discharge voltage of the battery cell 305 (and 2S battery pack 306 overall). Vd represents discharge voltage of the battery cell 303 (and 1S battery pack 304 overall). Ve represents supply voltage of external power source 302, which may range from 2-20 v, but may also be regulated to a point at or below a maximum charge voltage of the battery packs 304, 306 (e.g., at or below 13V). The battery monitor 314 uses the measured voltages to determine a state of charge of each of the battery cells 303, 305, 307 using a predefined relationship between voltage and state of charge for each of the battery cells 303, 305, 307. The battery monitor 314 communicates with the charge controller 315 (see ports f, g of the battery monitor 314) to direct field-effect transistors 364, 366 (e.g., charge and discharge MOSFETS (or back-to-back MOSFETs) to charge and/or discharge the battery packs 204, 206. In various implementations, the field-effect transistors 364, 366 and the charge controller 315 may referred to herein as a charge circuit.

In an implementation where the external power source 302 is connected, the field-effect transistors 364, 366 may selectively close to charge the battery packs 304, 306, as directed by the charge controller 315. Once the battery packs 304, 306 are fully charged, the field-effect transistors 364, 366 are opened to prevent overcharging of the battery packs 304, 306. In all battery states, the connected power source 302 may be used to provide the source voltage (Vs). In an implementation where the external power source 302 is disconnected, the battery packs 304, 306 provide the source voltage (Vs) through the field-effect transistors 364, 366. The source voltage (Vs) may be the same or similar to Vd, Ve, or a combination thereof.

Voltage regulator(s) 354, 356 generally step-down voltage to a level required to drive system load(s) 310, 311. In various implementations, there may be multiple voltage regulators that adjust voltage to different levels for different system loads. The system load(s) 310, 311 may include a variety of electronic components. Further, the system loads 310 may be the same or similar to system loads 311, or entirely different from one another.

The two device sections 350, 352 are divided by a device section boundary (or central hinged portion) 312, which may include a foldable interconnection or hinge. As discussed above, the battery packs 304, 306 and the accompanying field-effect transistors 364, 366 and charge controller 315 are configured to supply power to the system load(s) 310, 311. Signal connectors 362 provide signal connections between the device sections 350, 352 for the battery monitor 314 and the charge controller 315, as described above. As the signal connections are low power, the signal connectors 362 are not of a particularly high-impedance.

High-impedance connectors 358, 360 provide driving power connections between the device sections 350, 352. More specifically, high-impedance connector 358 transfers power between the battery packs 304, 306, as directed by the battery monitor 314 and the charge controller 315. High-impedance connector 360 provides power supplied by the external power source 302 and/or battery packs 304, 306 (Vs) in the device section 250 to the voltage regulator(s) 356 and system load(s) 311 in the device section 352. In various implementations, one or both of the system load(s) 310, 311 may require a supply voltage level that is greater than the voltage level associated with one or either of the battery packs 304, 306, but less than a combined voltage level output from both of the battery packs 304, 306.

While the battery pack 306 and the battery monitor 314 are depicted in the device section 252, while the battery pack 304 and the field-effect transistors 364, 366/charge controller 315 are depicted in the device section 350, the relative location of the components of the circuit 300 may vary widely from that shown so long as the battery packs 304, 306 share a common battery monitor 314 and a common set of field-effect transistors 364, 366/charge controller 315.

The high impedance connectors 358, 360 bridge the device section boundary 312 and may present a voltage drop equal to or greater than 5% of the supply voltage (Vs) to the system load(s) 310, 311. In other implementations, the high impedance connectors 358, 360 may present a voltage drop equal to or greater than 10% of the supply voltage (Vs) to the system load(s) 310, 311. Either implementation is referred to herein as a high-impendence connection.

In various implementations, the series battery management circuit 300 includes supplemental protection features. For example, a thermal cut-off 368 may be oriented at the output of the battery pack 304. If a high-temperature threshold is reached, the thermal cut-off 368 may cut output power from the battery packs 304, 306, thus preventing them from further charging or discharging. A level shift circuit 370 may detect an abnormal charge imbalance between the battery cells 303, 305, 307 indicating the presence of a fault. The level shift circuit 370 then may direct the charge controller to disconnect the battery packs 304, 306. Still further, each of the battery packs 304, 306 may include integrated protection circuitry, including but not limited to thermal protection, that disconnects power if an internal fault is detected.

Additional details of circuit 300 of FIG. 3 may be as described elsewhere herein, including above with reference to computing device 100 of FIG. 1 and circuit 200 of FIG. 2.

Figure 4:
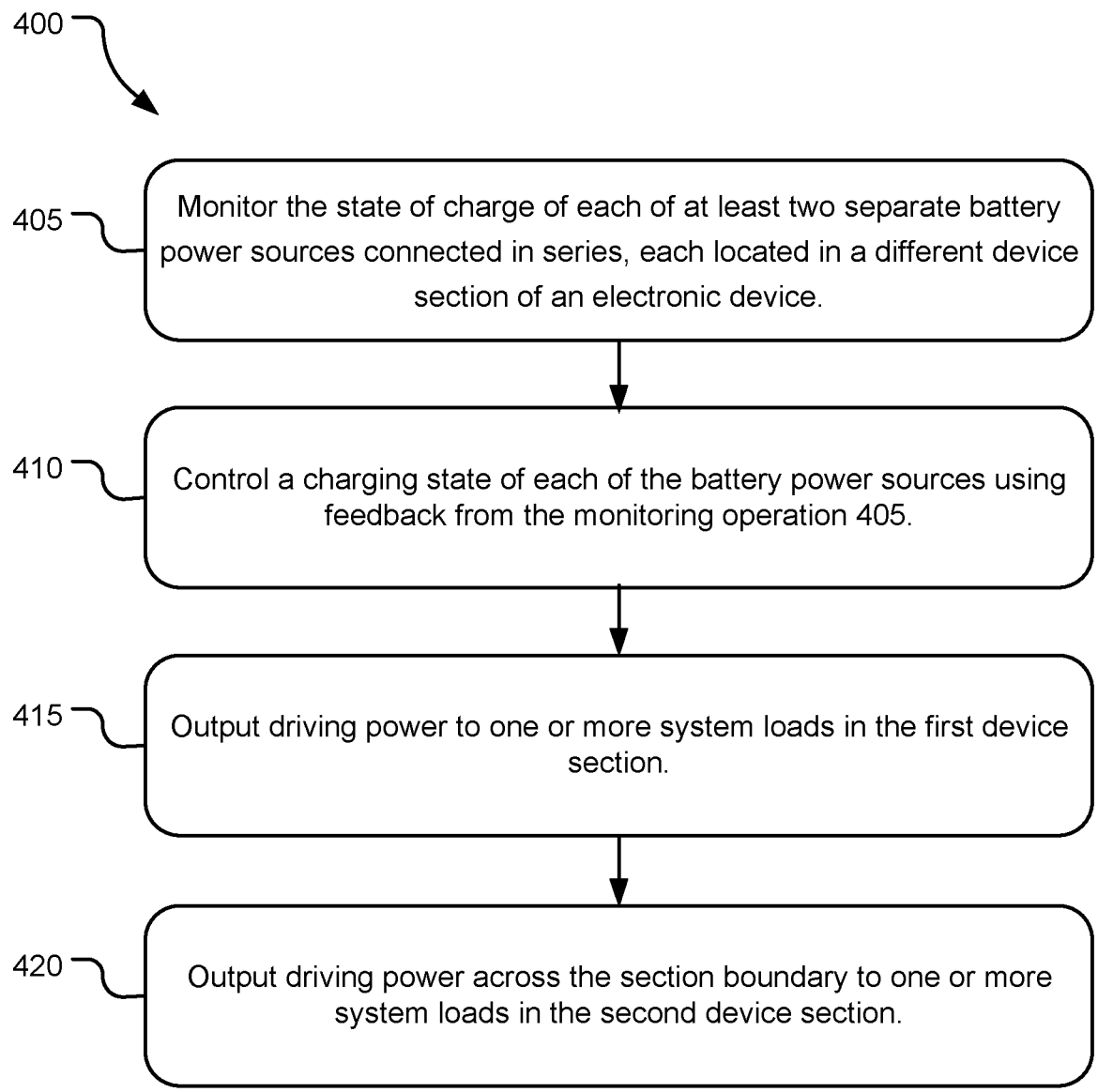
FIG. 4 illustrates example operations for providing series battery management.

FIG. 4 illustrates example operations 400 for providing series battery management. The operations 400 generally provide for common management of power supplied in series across a high-impedance section boundary of an electronic device that has multiple reconfigurable sections (e.g., a hinged or folding device). A monitoring operation 405 monitors the state of charge of each of at least two separate battery power sources connected in series, each located in a different device section. The monitoring operation 405 is performed by a common battery monitor that is located in one of the device sections, although it monitors the battery power sources located in different device sections.

A controlling operation 410 controls a charging state of each of the battery power sources using feedback from the monitoring operation 405. In various implementations, the controlling operation 410 is performed by a common charge controller that is also located in one of the device sections, although it controls charging state of the battery power sources located in different device sections. For example, the controlling operation 410 may permit transmitting charging power from the second battery power source across the section boundary to the first battery power source when the first battery power source state of charge is low. For further example, the controlling operation 410 may permit transmitting power output from the first battery power source across the section boundary to the second battery power source when using the first battery power source at least in part to power various system loads of the electronic device.

A first outputting operation 415 outputs driving power to one or more system loads in the first device section. The driving power may come from one or more of the battery power sources and an external power source depending on battery state of charge and whether the external power source is present. In various implementations, the outputting operation 415 also includes voltage regulation, which generally steps-down voltage to match the requirements of the system loads.

A second outputting operation 420 outputs driving power across the section boundary to one or more system loads in the second device section. The driving power may come from one or more of the battery power sources and an external power source depending on battery state of charge and whether the external power source is present. In various implementations, the outputting operation 420 also includes voltage regulation, which generally steps-down voltage to match the requirements of the system loads.

Figure 5:
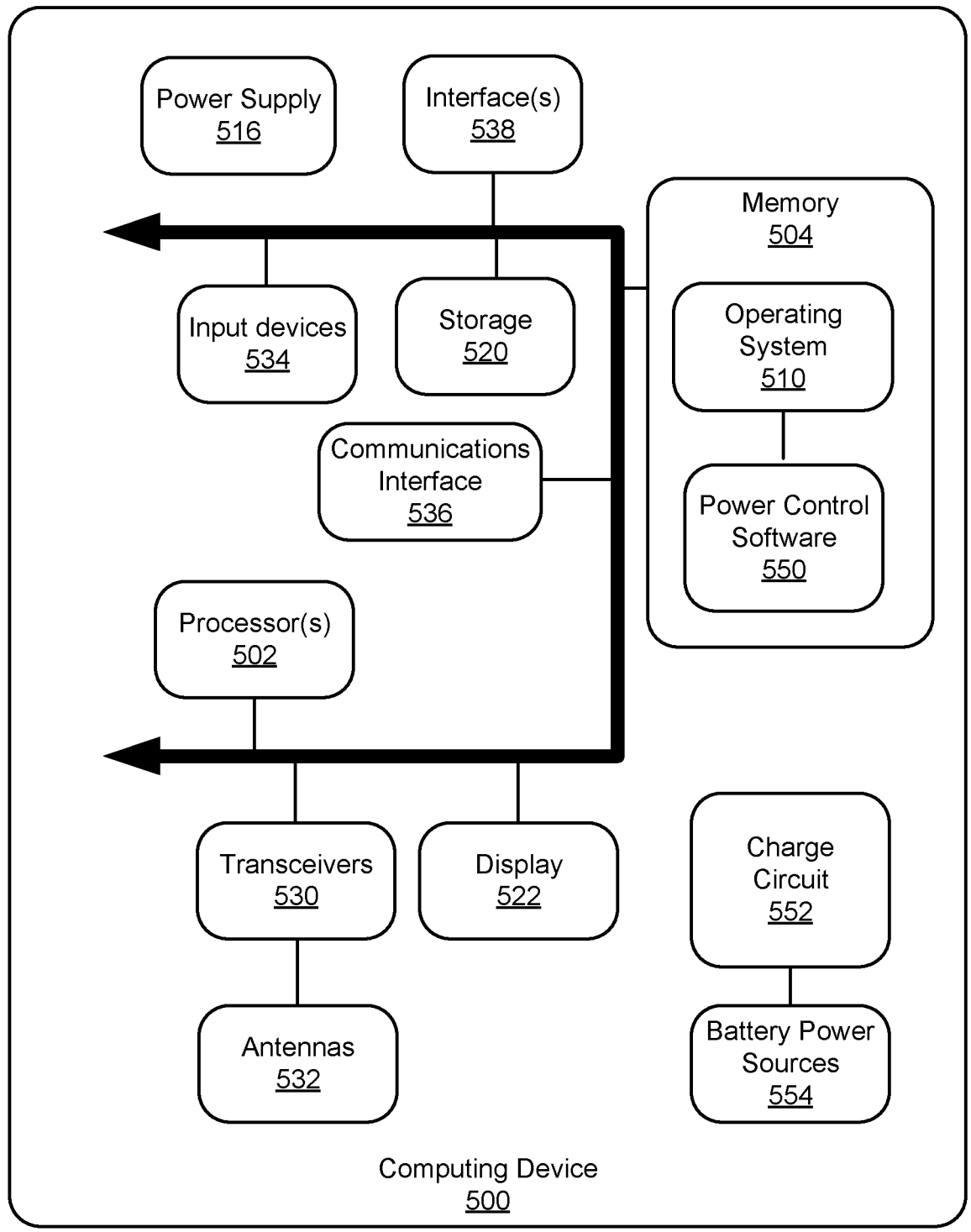
FIG. 5 illustrates an example computing device for use in providing series battery management.

FIG. 5 illustrates an example computing device for use in providing series battery management. The computing device 500 may be a client device, such as a laptop, mobile device, desktop, tablet, or a server/cloud device. The computing device 500 includes one or more processor(s) 502, and a memory 504. The memory 504 generally includes both volatile memory (e.g., RAM) and non-volatile memory (e.g., flash memory). An operating system 510 resides in the memory 504 and is executed by the processor(s) 502.

In an example computing device 500, as shown in FIG. 5, one or more modules or segments, such as power control (including charge/discharge management) software 550, application modules, and other modules, are loaded into the operating system 510 on the memory 504 and/or storage 520 and executed by processor(s) 502. The storage 520 may be stored battery characteristics, charge levels, system load requirements, and other data and be local to the computing device 500 or may be remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources. In one implementation, charge management circuitry 552 is electrically coupled to multiple battery power sources 554 to distribute power to one or more system loads in the computing device 500

The computing device 500 may include one or more communication transceivers 530 which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a network adapter 536, which is a type of communication device. The computing device 500 may use the adapter and any other types of communication devices for establishing connections over a wide-area network (WAN) or local-area network (LAN). It should be appreciated that the network connections shown are exemplary and that other communications devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538 such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example implementation of an electronic device comprises a first device section, a second device section, and a high impedance electrical connection. The first device section contains a first battery power source including at least one cell, the first battery power source having a first associated voltage level. The second device section contains a second battery power source including at least two cells connected in series, the second battery power source having a second associated voltage level, the second associated voltage level being higher than the first associated voltage level. The high impedance electrical connection traverses a device section boundary connecting the first device section to the second device section, the first and the second battery power sources connected in series with respect to a system load of the electronic device across the device section boundary via the high impedance electrical connection, the system load requiring a supply voltage level that is greater than the second associated voltage level and less than a combination of the first associated voltage level and the second associated voltage level.

Another example implementation of any preceding electronic device includes a battery monitor to monitor state of charge of each battery cell within the first battery power source and each battery cell within the second battery power source.

In another example implementation of any preceding electronic device, the battery monitor is located in the second device section.

Another example implementation of any preceding electronic device includes a charging circuit to selectively direct power from an external power source to the first battery power source and the second battery power source, the battery monitor to direct a state of the charging circuit.

In another example implementation of any preceding electronic device, the charging circuit includes a pair of field-effect transistors controlled by a charge controller.

In another example implementation of any preceding electronic device, the battery monitor is located in the first device section.

In another example implementation of any preceding electronic device, the battery monitor directs the charging circuit to disconnect one or both of the first battery power source and the second battery power source from the external power source should a fault be detected.

Another example implementation of any preceding electronic device includes one or more protection circuits in one or both of the first device section and the second device section.

Another example implementation of any preceding electronic device includes a thermal cut-off to disconnect an output of the first battery power source and the second battery source from an external power source should a temperature of the electronic device exceed a threshold.

Another example implementation of any preceding electronic device includes one or more voltage converters in the first device section to step down the associated voltage levels output from the first battery power source and the second battery power source; and one or more system loads to consume power at the stepped down voltage output from the one or more voltage converters.

Another example implementation of any preceding electronic device includes one or more voltage converters in the second device section to step down the voltage levels output from the first battery power source and the second battery power source; and one or more system loads to consume power at the stepped down voltage output from the one or more voltage converters.

In another example implementation of any preceding electronic device, the series connection across the device section boundary causes a voltage drop equal to at least 10% of a supply voltage.

In another example implementation of any preceding electronic device, the voltage level output from each battery cell within the first battery power source and the second battery power source are equal.

In another example implementation of any preceding electronic device, the device section boundary is one of a hinged boundary and a flexible boundary.

An example method of controlling battery power sources connected in series across a device section boundary of a computing device comprises monitoring state of charge of each of a first battery power source in a first device section and a second battery power source in a second device section at a common battery monitor, controlling charging state of the first battery power source and the second battery power source at a common charging circuit, outputting driving power to a system load in the first device section, and outputting driving power across the section boundary to a system load in the second device section.

Another example method of controlling battery power sources connected in series across a device section boundary of a computing device includes transmitting charging power from the second battery power source across the section boundary to the first battery power source.

Another example method of controlling battery power sources connected in series across a device section boundary of a computing device includes transmitting power output from the first battery power source across the section boundary to the second battery power source.

In another example method of controlling battery power sources connected in series across a device section boundary of a computing device, the series connection across the device section boundary causes a voltage drop equal to at least 10% of a supply voltage.

An example electronic device including a first device section and a second device section comprises a first battery power source, and a second battery power source. The first battery power source includes at least one cell in the first device section. The second battery power source includes at least two cells connected in series in the second device section. The second battery power source is connected in series across a re-configurable device section boundary connecting the first device section to the second device section.

Another example implementation of any preceding electronic device includes a first device section containing the first battery power source, a second device section containing the second battery power source, and a high impedance electrical connection. The first device section and the second device section are separated by the device section boundary. The high impedance electrical connection traversing the device section boundary and connecting the second battery power source to the first battery power source.

An example electronic device for controlling battery power sources connected in series across a device section boundary of a computing device comprises means for monitoring state of charge of each of a first battery power source in a first device section and a second battery power source in a second device section at a common battery monitor, means for controlling charging state of the first battery power source and the second battery power source at a common charging circuit, means for outputting driving power to a system load in the first device section, and means for outputting driving power across the section boundary to a system load in the second device section.

Another example electronic device for controlling battery power sources connected in series across a device section boundary of a computing device includes means for transmitting charging power from the second battery power source across the section boundary to the first battery power source.

Another example electronic device for controlling battery power sources connected in series across a device section boundary of a computing device includes means for transmitting power output from the first battery power source across the section boundary to the second battery power source.

In another example electronic device for controlling battery power sources connected in series across a device section boundary of a computing device, the series connection across the device section boundary causes a voltage drop equal to at least 10% of a supply voltage.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An electronic device comprising:
a first device section containing a first battery power source including at least one cell, the first battery power source having a first associated voltage level;
a second device section containing a second battery power source including at least two cells connected in series, the second battery power source having a second associated voltage level, the second associated voltage level being higher than the first associated voltage level; and
a high impedance electrical connection traversing a device section boundary connecting the first device section to the second device section, the first and the second battery power sources connected in series with respect to a system load of the electronic device across the device section boundary via the high impedance electrical connection, the system load requiring a supply voltage level that is greater than the second associated voltage level and less than a combination of the first associated voltage level and the second associated voltage level, the high impedance electrical connection causing a voltage drop equal to at least 5% of a supply voltage.

2. The electronic device of claim 1, further comprising:
a battery monitor to monitor state of charge of each battery cell within the first battery power source and each battery cell within the second battery power source.

3. The electronic device of claim 2, wherein the battery monitor is located in the second device section.

4. The electronic device of claim 2, further comprising:
a charging circuit to selectively direct power from an external power source to the first battery power source and the second battery power source, the battery monitor to direct a state of the charging circuit.

5. The electronic device of claim 4, wherein the charging circuit includes a pair of field-effect transistors controlled by a charge controller.

6. The electronic device of claim 4, wherein the battery monitor is located in the first device section.

7. The electronic device of claim 4, the battery monitor to direct the charging circuit to disconnect one or both of the first battery power source and the second battery power source from the external power source should a fault be detected.

8. The electronic device of claim 1, further comprising:
one or more protection circuits in one or both of the first device section and the second device section.

9. The electronic device of claim 1, further comprising:
a thermal cut-off to disconnect an output of the first battery power source and the second battery source from an external power source should a temperature of the electronic device exceed a threshold.

10. The electronic device of claim 1, further comprising:
one or more voltage converters in the first device section to step down the associated voltage levels output from the first battery power source and the second battery power source; and
one or more system loads to consume power at the stepped down voltage output from the one or more voltage converters.

11. The electronic device of claim 1, further comprising:
one or more voltage converters in the second device section to step down the voltage levels output from the first battery power source and the second battery power source; and
one or more system loads to consume power at the stepped down voltage output from the one or more voltage converters.

12. The electronic device of claim 1, the high impedance electrical connection causing a voltage drop equal to at least 10% of the supply voltage.

13. The electronic device of claim 1, wherein the voltage level output from each battery cell within the first battery power source and the second battery power source are equal.

14. The electronic device of claim 1, wherein the device section boundary is one of a hinged boundary and a flexible boundary.

15. A method of controlling battery power sources connected in series across a device section boundary of a computing device, the method comprising:
monitoring state of charge of each of a first battery power source in a first device section and a second battery power source in a second device section at a common battery monitor;

controlling charging state of the first battery power source and the second battery power source at a common charging circuit;

outputting driving power to a system load in the first device section; and outputting driving power across the section boundary to a system load in the second device section.

16. The method of claim 15, wherein the controlling operation includes:

transmitting charging power from the second battery power source across the section boundary to the first battery power source.

17. The method of claim 15, wherein the controlling operation includes:

transmitting power output from the first battery power source across the section boundary to the second battery power source.

18. The method of claim 15, wherein a high impedance electrical connection traverses the device section boundary and connects the second battery power source to the first battery power source, the high impedance electrical connection causing a voltage drop equal to at least 5% of a supply voltage.

19. An electronic device including a first device section and a second device section, the electronic device comprising:

a first battery power source including at least one cell in the first device section; and a second battery power source including at least two cells connected in series in the second device section, the second battery power source connected in series to the first battery power source across a re-configurable device section boundary connecting the first device section to the second device section.

20. The electronic device of claim 19, further comprising:

a first device section containing the first battery power source;

a second device section containing the second battery power source, the first device section and the second device section being separated by the device section boundary;

a high impedance electrical connection traversing the device section boundary and connecting the second battery power source to the first battery power source, the high impedance electrical connection causing a voltage drop equal to at least 5% of a supply voltage.

* * * * *